United States Patent [19]

Ippolito et al.

[11] Patent Number: 5,295,921
[45] Date of Patent: Mar. 22, 1994

[54] SYSTEM FOR CONTROLLING TORQUE DISTRIBUTION BETWEEN THE WHEELS OF A COMMON VEHICLE AXLE

[75] Inventors: Luigi Ippolito, Pianezza; Giorgio Lupo, Rivalta; Alessandro Lorenzini, Lido di Ostia, all of Italy

[73] Assignee: Centro Ricerche Fiat Societa Consortill per Azioni, Strada Torino, Italy

[21] Appl. No.: 993,088

[22] Filed: Dec. 18, 1992

[30] Foreign Application Priority Data

Dec. 20, 1991 [IT] Italy ............................ T091A00106

[51] Int. Cl.[5] ............................................. F16H 1/44
[52] U.S. Cl. ................................. 475/238; 475/231; 192/49
[58] Field of Search ............... 475/231, 238; 192/49

[56] References Cited

U.S. PATENT DOCUMENTS

| | | | |
|---|---|---|---|
| 4,681,180 | 7/1987 | Oyama et al. | 192/49 X |
| 4,914,980 | 4/1990 | Taureg et al. | 475/231 X |
| 5,098,360 | 3/1992 | Hirota | 475/231 X |
| 5,125,876 | 6/1992 | Hirota | 475/231 |
| 5,189,930 | 3/1993 | Kameda | 192/49 X |

FOREIGN PATENT DOCUMENTS

| | | | |
|---|---|---|---|
| 356276 | 2/1990 | European Pat. Off. | 475/238 |
| 4-123934 | 4/1992 | Japan | 475/231 |
| 9005250 | 5/1990 | World Int. Prop. O. | 475/238 |

*Primary Examiner*—Leslie A. Braun
*Assistant Examiner*—Andrea Pitts
*Attorney, Agent, or Firm*—Ladas & Parry

[57] ABSTRACT

A system having a pair of axle shafts; an input shaft for transmitting torque; and a differential for transmitting motion from the input shaft to the axle shafts and in turn presenting a planet carrier angularly integral with the input shaft, and a pair of sun gears; the system also presenting a first clutch interposed between each axle shaft and a respective sun gear, a second clutch interposed between each axle shaft and the planet carrier; and a device for controlling the clutches and continuously varying distribution of the torque between the axle shafts.

9 Claims, 3 Drawing Sheets

SYSTEM FOR CONTROLLING TORQUE DISTRIBUTION BETWEEN THE WHEELS OF A COMMON VEHICLE AXLE

BACKGROUND OF THE INVENTION

The present invention relates to a system for instantaneously controlling torque distribution between the wheels of a common vehicle axle.

More specifically, the present invention relates to a system of the type comprising a pair of axle shafts, each connected angularly integral with a respective drive wheel on the vehicle; an input shaft for transmitting torque; and a differential for transmitting motion from the input shaft to the axle shafts; the differential presenting a planet carrier, a ring gear meshing with the input shaft and integral with the planet carrier, and a pair of sun gears.

On known systems of the aforementioned type, torque distribution between the two axle shafts may be effected either equally, using traditional differentials, or in different percentages, using special differentials, each with its own torque distribution range.

In other words, the type of differential selected according to the operating conditions of the vehicle univocally determines the manner in which torque is distributed between the vehicle wheels.

SUMMARY OF THE INVENTION

It is an object of the present invention to provide an instantaneous torque distribution control system designed to overcome the above limitations by varying the torque between the wheels continuously between 0-100% and 100-0%.

According to the present invention, there is provided a system for instantaneously controlling torque distribution between the wheels of a common vehicle axle, the system comprising a pair of axle shafts, each connected angularly integral with a respective drive wheel on the vehicle; an input shaft for transmitting torque; and a differential for transmitting motion from said input shaft to said axle shafts; the differential presenting a planet carrier angularly integral with said input shaft, and a pair of sun gears; characterized by the fact that it comprises first releasable angular connecting means interposed between each said axle shaft and a respective said sun gear; and second releasable angular connecting means interposed between each said axle shaft and said planet carrier; control means being provided for so controlling said first and second angular connecting means as to continuously vary distribution of said torque between said axle shafts.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
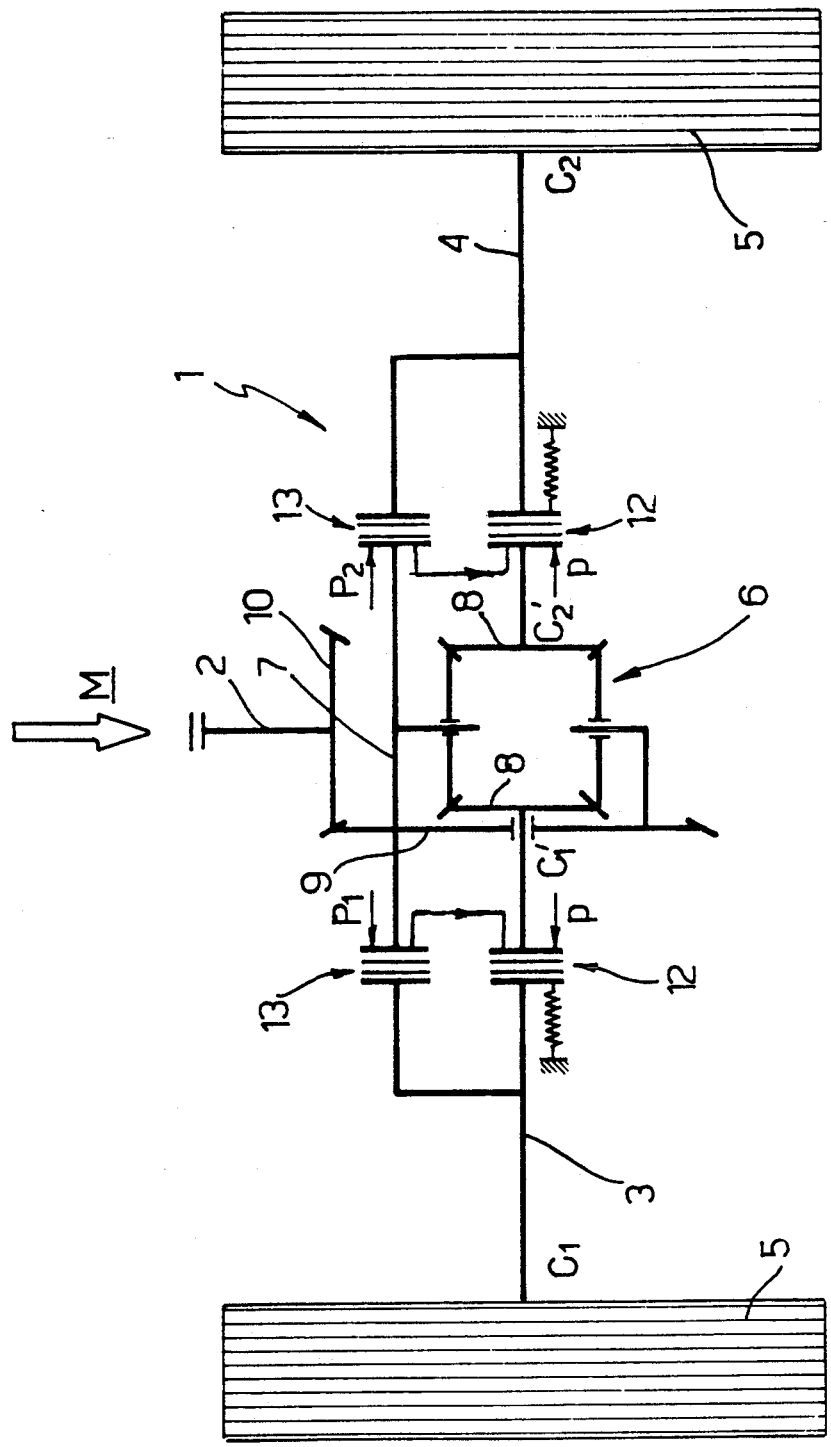
FIG. 1 shows, schematically and substantially in block form, a first preferred embodiment of the system according to the present invention.

Number 1 in the accompanying drawings indicates a system for instantaneously controlling torque distribution between the wheels of a common vehicle axle, which system 1 comprises an input shaft 2; a pair of axle shafts 3, 4, each connected to a respective wheel 5 (FIG. 1) on the vehicle (not shown); and a differential 6 for transmitting motion from input shaft 2 to axle shafts 3, 4.

Differential 6 comprises a planet carrier 7; a pair of sun gears 8; and a ring gear 9 integral with planet carrier 7 and meshing with a gear 10 fitted on to input shaft 2.

For each axle shaft 3, 4, system 1 comprises a first and second multiple-disk clutch 12 and 13 arranged adjacent to each other and interposed between differential 6 and each axle shaft 3, 4. System 1 also comprises a control device 14 (FIG. 2) for controlling clutches 12 and 13 and continuously varying the distribution between axle shafts 3 and 4 of torque M supplied by input shaft 2.

More specifically (FIG. 2), clutches 12 and 13 of each axle shaft 3, 4 present a common bell 16 connected angularly integral, in known manner, with respective axle shaft 3, 4; and respective hubs 17 and 18 respectively connected angularly integral with a respective sun gear 8 and planet carrier 7.

Figure 2:
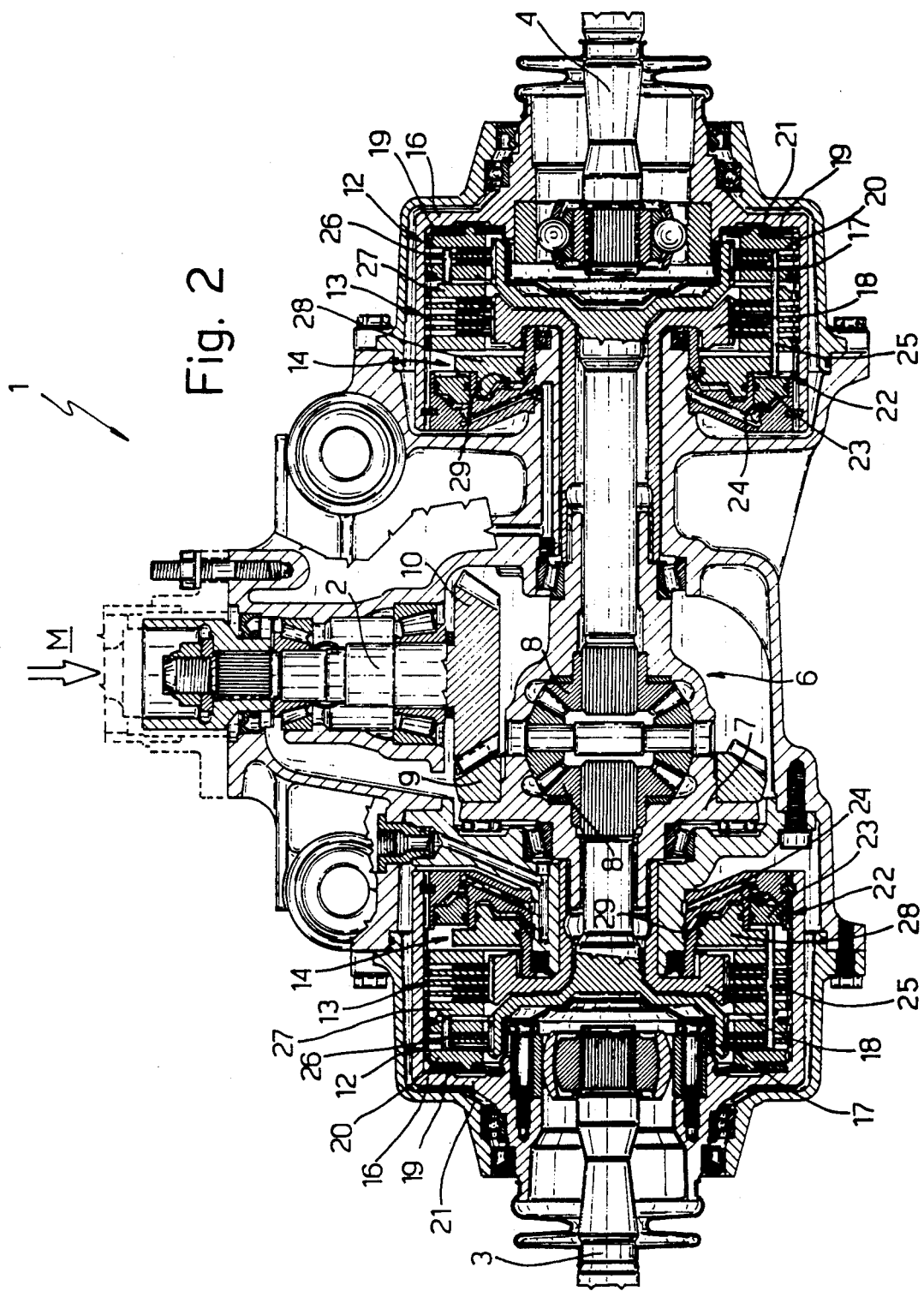
FIG. 2 shows a section of the FIG. 1 system.

As shown in FIG. 2, for clutches 12 and 13 of each axle shaft 3, 4, device 14 comprises an elastic element 19, conveniently a Belleville washer, interposed between end disk 20 of first clutch 12 and end wall 21 of bell 16, and which provides for controlling closure of first clutch 12; and a first hydraulic actuator 22 in turn comprising a first annular hydraulic piston 23 located on the opposite side of first and second clutches 12 and 13 in relation to elastic element 19, and which is moved inside a chamber 24 by pressurized fluid fed into chamber 24.

First actuator 22 also comprises a number of first rods 25 (only one of which is shown in FIG. 2) interposed between first piston 23 and end disk 20 of first clutch 12, and cooperating with first piston 23 so as to exert force on first clutch 12, more specifically on end disk 20 of first clutch 12, in opposition to the force exerted by elastic element 19.

For clutched 12 and 13 of each axle shaft 3, 4, device 14 also comprises a number of second rods 26 (only one of which is shown) interposed between end disk 20 of first clutch 12 and a corresponding end disk 27 of second clutch 13, adjacent to first clutch 12.

For each axle shaft 3, 4, device 14 also comprises a second hydraulic piston 28 coaxial with and adjacent to first hydraulic piston 23, and which is moved inside a chamber 29 by pressurized fluid fed into chamber 29, for controlling closure of second clutch 13.

Again with reference to FIG. 2, second rods 26 are activated indirectly by second piston 28, and provide for exerting on end disk 20 of first clutch 12 a force in opposition to that exerted by elastic element 19, and substantially proportional to the force exerted by second piston 28 on second clutch 13.

In actual use, assuming chambers 24 and 29 housing respective pistons 23 and 28 are exhausted, so that pistons 23 and 28 are withdrawn into the idle position, first clutches 12 are closed by respective elastic elements 19, and second clutches 13 are open. In the above condition, system 1 operates in the same way as a traditional system, by virtue of first clutches 12 angularly connecting respective axle shafts 3, 4 to a respective sun gear 8, so that input torque M is distributed equally between axle shafts 3 and 4. With reference to FIG. 1, if C1 and C2 are the torques on wheels 5, and C1' and C2' the corresponding torques on sun gears 8, then M=C1+C2 and C1'=C2', due to the presence of differential 6.

When chamber 29 on the other hand, second pistons 28 close respective second clutches 13, the disks of which are packed between respective second rods 26 and second pistons 28, thus providing substantially for a direct drive condition by virtue of excluding differential 6.

As shown in the drawings, for transferring additional torque (even the whole of input torque M) to one of wheels 5, e.g. the left wheel (C1>C2), this is achieved by simply feeding fluid into the left chamber 24 and exhausting the other chambers 24 and 29. When fluid is fed into left chamber 24, second clutch 13 is closed gradually by second piston 28 and, at the same time, first clutch 12 (on the left) is opened gradually by second rods 26, thus gradually reducing the torque transmitted to right wheel 5 and accordingly increasing gradually the torque transmitted to left wheel 5.

When second clutch 13 is eventually fully closed and first clutch 12 fully open, the whole of input torque M will he transmitted to left wheel 5 (M=C1), and no torque will be transmitted to right wheel 5.

Obviously, for increasing the torque transmitted to right wheel 5, fluid is fed into the right chamber 24 and the other chambers 24 and 29 exhausted, so that M=C2.

Fluid feed into the left chamber 24, on the other hand, provides for moving respective piston 23, which cooperates with rods 25 so as to open respective first clutch 12. More specifically, pistons 23 are controlled by a single pressure signal (FIG. 1) so as to continuously regulate the torque transmitted by clutches 12 as a function of torque M, and so gradually transfer torque from clutches 12 to 13, with no noticeable interruption in operation.

Clutches 13, on the other hand, are controlled by two different pressure signals p1 and p2 (FIG. 1).

Moreover, operation of system 1, that is, the manner in which torque is distributed between wheels 5, is determined instant by instant, as a function of vehicle status variables, i.e. according to the equation:

$$C1-C2=f(*).$$

Figure 3:
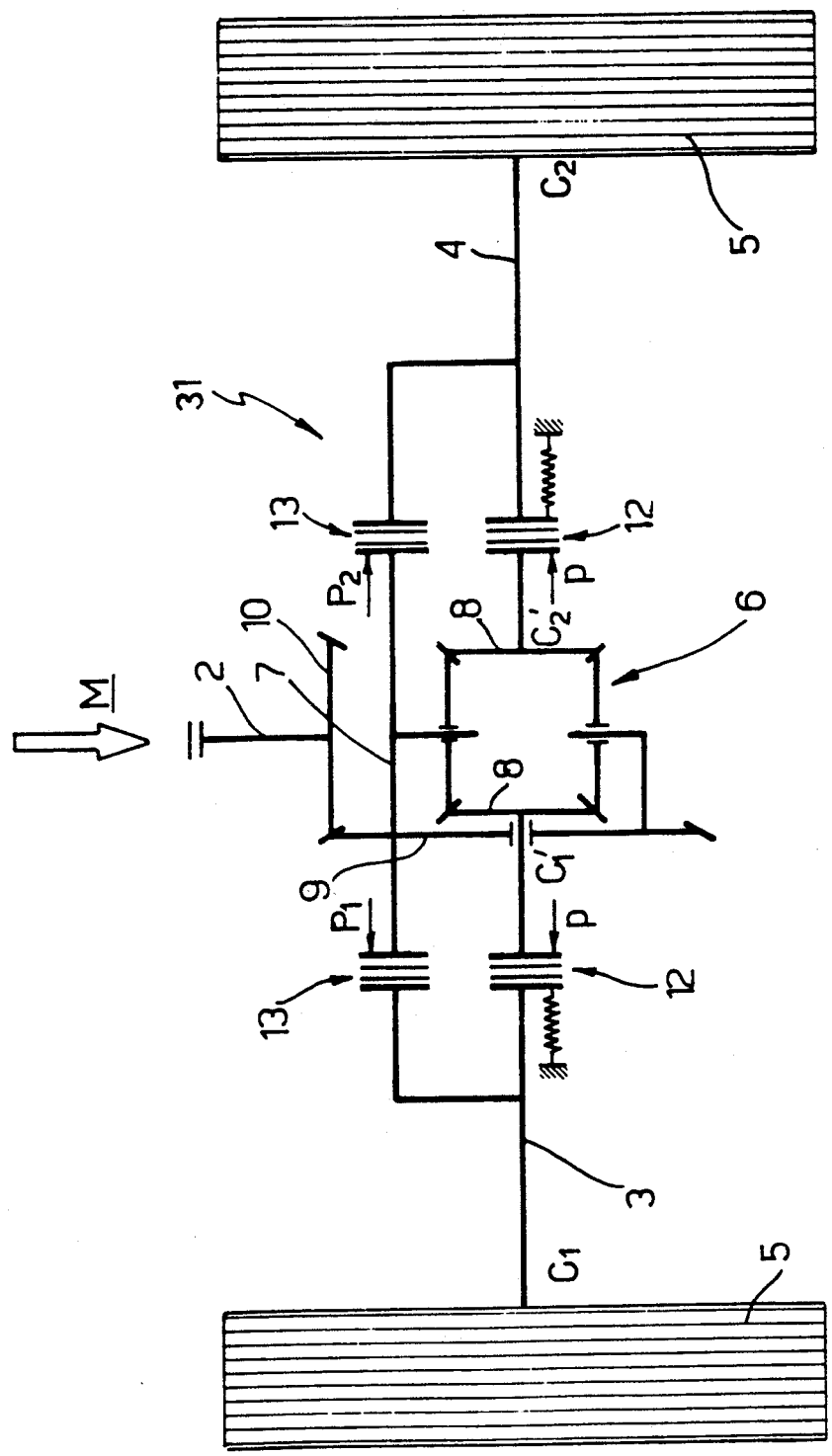
FIG. 3 shows, schematically and substantially in block form, a second preferred embodiment of the system according to the present invention.

The FIG. 3 variation relates to a system 31, which differs from system 1 by virtue of clutches 12 and 13 of each axle shaft 3, 4 being controlled independently. In other words, in system 31, second rods 26 are dispensed with, so that clutches 12, instead of being opened automatically as respective clutches 13 are closed, are opened directly by respective pistons 23 and respective first rods 24, which are controlled as described previously.

From the construction standpoint, therefore, system 31 differs from system 1 (FIG. 2) by virtue of having no second rods 26, and by virtue of comprising, for each second clutch 13, a fixed axial reference, preferably a retaining ring (not shown), for axially retaining disk 27 and so enabling closure of second clutch 13 by piston 28.

Systems 1 and 31 thus provide for two advantages. Firstly, they provide for continuously varying the distribution of torque M between axle shafts 3 and 4 and, consequently, between wheels 5 of the vehicle (not shown), thus enabling the vehicle to adapt continuously to any operating condition.

Secondly, first and second clutches 12 and 13 provide for active distribution of torque M, that is, for "translating" or rather transferring the torque on each wheel from one wheel 5 to the other, with no loss in torque.

Moreover, torque transfer from one wheel to the other is achieved in extremely straightforward manner, more specifically by supplying a control signal, in the example shown a hydraulic signal, for controlling one or other of second hydraulic pistons 28.

To those skilled in the art it will be clear that changes may be made to systems 1, 31 as described herein without, however, departing from the scope of the prevent invention. In particular, changes may be made to the type of clutch employed, or to device 14 for controlling the same.

We claim:

1. A system (1; 31) for instantaneously controlling torque distribution between wheels of a common vehicle axle, the system (1) comprising a pair of axle shafts (3, 4), each connected angularly integral with a respective drive wheel (5) on a vehicle; an input shaft (2) for transmitting torque (M); and a differential (6) for transmitting motion from said input shaft (2) to said axle shafts (3, 4); the differential (6) presenting a planet carrier (7) angularly integral with said input shaft (2), and a pair of sun gears (8); comprising: first releasable angular connecting means (12) interposed between each said axle shaft (3, 4) and a respective said sun gear (8); and second releasable angular connecting means (13) interposed between each said axle shaft (3, 4) and said planet carrier (7); control means (14) being provided for controlling said first and second angular connecting means (12, 13) to continuously vary distribution of said torque (M) between said axle shafts (3, 4).

2. A system as claimed in claim 1, characterized by the fact that said first and second angular connecting means are respectively defined by first (12) and second (13) clutches.

3. A system as claimed in claim 2, characterized by the fact that said first and second clutches (12, 13) comprise a common bell (16) angularly integral with a respective said axle shaft (3, 4); and respective hubs (17) (18) respectively connected angularly integral with a respective sun gear (8) and with said planet carrier (7).

4. A system as claimed in claim 2, characterized by the fact that, for the clutches (12, 13) of each said axle shaft (3, 4), said control means (14) comprise elastic thrust means (19) exerting a force on each first clutch (12); a first actuator (22) exerting a force on each first clutch (12) in opposition to the force exerted by said elastic means (19); and a second actuator (28) exerting a force on each said second clutch (13).

5. A system as claimed in claim 4, characterized by the fact that said control means (14) also comprise thrust means (26) for a force each said on first clutch (12) a force in opposition to the force exerted by said elastic means (19), and substantially proportional to the force exerted on each said second clutch (13) by each respective said second actuator (28).

6. A system as claimed in claim 4, characterized by the fact that each said elastic means (19) provide for closing respective first clutches (12), and each said second actuator (28) provides for closing each respective second clutche (13).

7. A system as claimed in claim 4, characterized by the fact that each said second actuator (28) provides for closing each respective said second clutche (13) and simultaneously opening each respective said first clutche (12) via respective said thrust means (26).

8. A system as claimed in claim 7, characterized by the fact that each said thrust means comprises a plurality of second rods (26) interposed between each respective said first (12) and second (13) clutches.

9. A system as claimed in claim 4, characterized by the fact that each said clutch (12, 13) is a multiple-disk clutch, and each said actuator (22)(28) comprises an annular hydraulic piston (23)(28); each said first actuator (22) also comprising a plurality of first rods (25) extending between each respective hydraulic piston (23) and respective said elastic means (19) and operating in such a manner as to open the respective said first clutch (12).

* * * * *

UNITED STATES PATENT AND TRADEMARK OFFICE
CERTIFICATE OF CORRECTION

PATENT NO. : 5,295,921
DATED : March 22, 1994
INVENTOR(S) : Luigi IPPOLITO, et al.

It is certified that error appears in the above-indentified patent and that said Letters Patent is hereby corrected as shown below:

On the title page item [30],

"T091A00106" should be --T091A001006--.

Signed and Sealed this

Fourteenth Day of March, 1995

Attest:

BRUCE LEHMAN

Attesting Officer         Commissioner of Patents and Trademarks

UNITED STATES PATENT AND TRADEMARK OFFICE
CERTIFICATE OF CORRECTION

PATENT NO. : 5,295,921
DATED : March 22, 1994
INVENTOR(S) : Luigi Ippolito, et al.

It is certified that error appears in the above-indentified patent and that said Letters Patent is hereby corrected as shown below:

On the title page, right column, item 56, after "475/238" (last occurrence), insert --0241382 10/1987 European Pat. Off.-- and --0511067 10/1992 European Pat. Off.-- and --2210341 6/1989 United Kingdom-- and --3545540 7/1987 Fed. Rep. of Germany--.

Signed and Sealed this

Sixteenth Day of May, 1995

Attest:

BRUCE LEHMAN

Attesting Officer                Commissioner of Patents and Trademarks